(12) United States Patent
Van Doren

(10) Patent No.: X6610
(45) Date of Patent: Jun. 13, 1831

(54) HORSE POWER, PORTABLE

(76) Inventor: Isaac Van Doren

Isaac Van Doren
Letters Patent

The Schedule referred to in these Letters Patent and making part of the same containing a description in the words of the said Isaac Van Doren himself of his improvement in the Portable horse power engine to propel all kinds of machinery by the application of the endless Screw.

---

This Engine consists of a wooden frame 44 inches long, 36 inches wide, and 32 in height, see Plate I Figure 1st.

Figure 2 represents a small spur wheel, of cast iron, fastened on a wrought iron axis, and in contact with the large spur-wheel, see Fig 3. C & C represent two cross pieces notched into the Posts, on the inside, and support the wrought iron axis A. Fig 3 is a cast iron Spur Wheel 35 inches in diameter, the plane of which is perpendicular to the horizon and is made fast on the axis A near the end. Fig 4 is a small spur wheel, of cast iron firmly fixed on the axis A, and in contact with the threads of the screw, figure 5. Figure 5 represents an endless Screw made of a cast iron cylinder 4 inches in length and 18 in diameter, the threads of which are on the circumference of the cylinder, projecting half an inch and inclined to its base in an angle of about ten degrees and are 3/4 of an inch asunder, and about the same in breadth: The screw is firmly fixed and supported on an upright, cast iron shaft, or axis (see the figure), the lower end of which rests in a step on the cross piece C sustained by two of the ground sills at each end, in the middle of the frame: The upper end of the shaft passes thro' the cross piece T directly over the frame, to the height of six or eight inches above the frame: On the upper end of this shaft a lever..... six feet long is fixed, (see L) to which the power is applied to put the engine in motion; ~~and one horse;~~ and one horse, at the end of this lever, will perform with ease, the work which requires the power of nearly five to execute in the usual way,: and if four levers each to describe a circle of six feet radius, be placed at right angles on the end of the shaft above the frame, with a horse at each extreme, the power will be nearly equal to twenty horses on the common plan of gearing, The endless screw, although an old instrument, yet the application of it I claim particularly as my own discovery, and contemplate its application as an effective agent in the construction of saw mills, grist mills, slitting mills, cotton and linnen manufactories and all steam engines and machines propelled by horse power &c Fig. 6 represents a drum or whirr fastened on the end of the wrought iron shaft or axis Fig 2, to which a strap or band may be applied to communicate motion to the various kinds of machinery. In some cases it may be expedient to substitute spur wheels for whirrs and bands to convey the power of the engine to other machines.

Plan III represents the horse power engine communicating motion to the new and improved threshing machine by the intervention of bands &c Isaac Van Doren Witnesses